United States Patent
Takeno et al.

(10) Patent No.: US 10,960,752 B2
(45) Date of Patent: Mar. 30, 2021

(54) ELECTRIC VEHICLE

(71) Applicant: Toyota Jidosha Kabushiki Kaisha, Toyota (JP)

(72) Inventors: Motoki Takeno, Nisshin (JP); Hiroki Kato, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 16/255,262

(22) Filed: Jan. 23, 2019

(65) Prior Publication Data

US 2019/0225076 A1 Jul. 25, 2019

(30) Foreign Application Priority Data

Jan. 25, 2018 (JP) .............................. JP2018-010590

(51) Int. Cl.
*B60K 11/02* (2006.01)
*B60L 50/60* (2019.01)
(Continued)

(52) U.S. Cl.
CPC ................ *B60K 11/02* (2013.01); *B60K 1/00* (2013.01); *B60K 6/22* (2013.01); *B60L 50/51* (2019.02); *B60L 50/60* (2019.02); *H02K 9/19* (2013.01); *H02K 11/33* (2016.01); *B60K 2001/003* (2013.01); *B60K 2001/006* (2013.01); *B60L 2210/40* (2013.01); *B60L 2240/425* (2013.01);
(Continued)

(58) Field of Classification Search
CPC .......... H02K 11/33; B60L 50/51; B60K 11/02
See application file for complete search history.

(56) References Cited

U.S. PATENT DOCUMENTS

2011/0246007 A1* 10/2011 Choi .................... F01P 7/04
701/22
2014/0010684 A1* 1/2014 Joschko ................ H05K 7/209
417/410.1

(Continued)

FOREIGN PATENT DOCUMENTS

DE  102015113844 A1  3/2016
JP  2016052844 A  4/2016

(Continued)

OTHER PUBLICATIONS

Gentaro, Hybrid Vehicle, 2017, Full Document (Year: 2017).*

*Primary Examiner* — Elizabeth J Martin
*Assistant Examiner* — Nael N Babaa
(74) *Attorney, Agent, or Firm* — Dinsmore & Shohl LLP

(57) ABSTRACT

Provided is an electric vehicle includes a power control unit, a driving motor, a first cooling channel fitted with a first pump that causes a first cooling liquid cooled in a first heat exchanger to flow through the power control unit and a second heat exchanger in this order and return to the first heat exchanger, and a second cooling channel fitted with a second pump that causes a second cooling liquid cooled by the first cooling liquid in the second heat exchanger to flow through the driving motor and return to the second heat exchanger. The second pump starts or stops circulation of the second cooling liquid, or increases or reduces a circulation volume of the second cooling liquid, based on one or both of the temperature of the power control unit and the temperature of the first cooling liquid.

7 Claims, 3 Drawing Sheets

(51) Int. Cl.
   *B60L 50/51*   (2019.01)
   *B60K 6/22*    (2007.10)
   *H02K 9/19*    (2006.01)
   *H02K 11/33*   (2016.01)
   *B60K 1/00*    (2006.01)

(52) U.S. Cl.
   CPC ..... *B60L 2240/525* (2013.01); *B60Y 2200/91* (2013.01); *B60Y 2200/92* (2013.01); *B60Y 2306/05* (2013.01)

(56) References Cited

U.S. PATENT DOCUMENTS

2015/0231988 A1\* 8/2015 Hisada .............. H01M 10/6568
                                                    318/139
2016/0069231 A1   3/2016 Nishimine
2018/0163607 A1\* 6/2018 Uto .................. B60K 11/04

FOREIGN PATENT DOCUMENTS

| JP | 2017-087801 A  |   | 5/2017 |           |
|----|----------------|---|--------|-----------|
| JP | 2017087801 A   | * | 5/2017 |           |
| JP | 6483654 B2     | * | 3/2019 | H01M 10/613 |

\* cited by examiner

FIG. 2

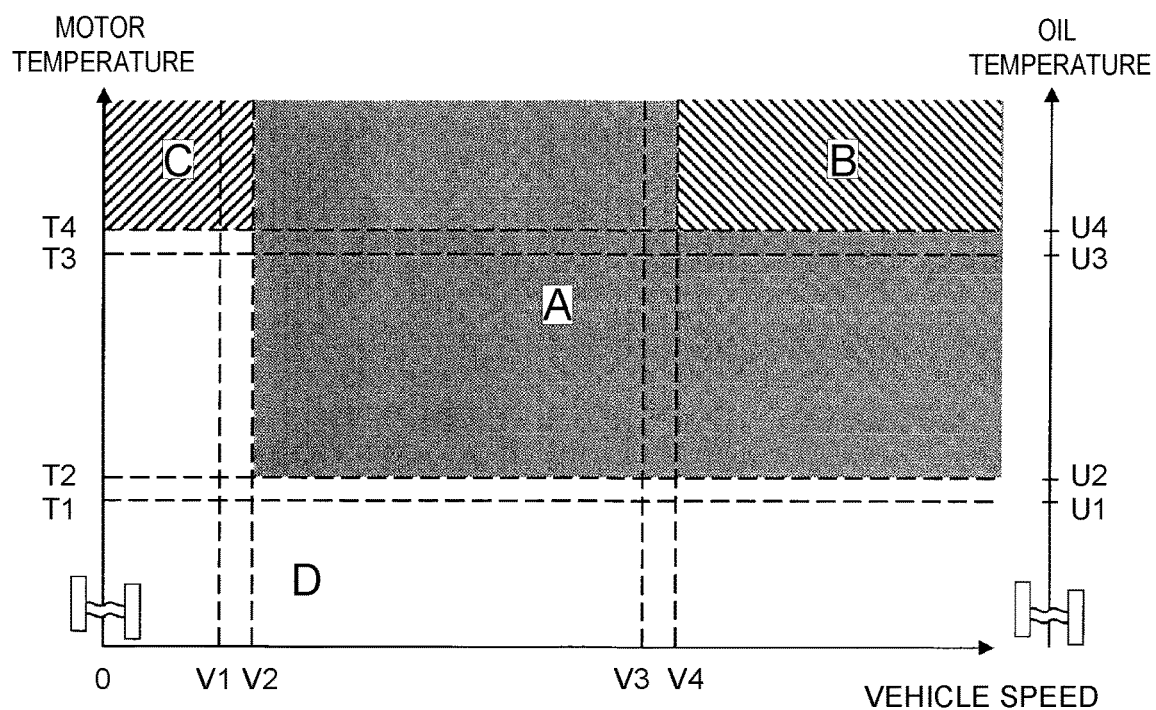

FIG. 3

| INTER-REGIONAL TRANSITION | CONDITION |
|---|---|
| D → A | VEHICLE SPEED ≥ V2 AND [ MOTOR TEMPERATURE ≥ T2 OR COOLING OIL TEMPERATURE ≥ U2 ] |
| D → C | VEHICLE SPEED < V2 AND [ MOTOR TEMPERATURE ≥ T4 OR COOLING OIL TEMPERATURE ≥ U4 ] |
| A → A | [ VEHICLE SPEED ≥ V1 AND [ MOTOR TEMPERATURE ≥ T1 OR COOLING OIL TEMPERATURE ≥ U1 ] ] OR [ VEHICLE SPEED < V4 OR [ MOTOR TEMPERATURE < T4 AND COOLING OIL TEMPERATURE < U4 ] |
| A → B | VEHICLE SPEED ≥ V4 AND [ MOTOR TEMPERATURE ≥ T4 OR COOLING OIL TEMPERATURE ≥ U4 ] |
| A → C | VEHICLE SPEED < V1 AND [ MOTOR TEMPERATURE ≥ T4 OR COOLING OIL TEMPERATURE ≥ U4 ] |
| A → D | [VEHICLE SPEED < V1 AND [ MOTOR TEMPERATURE < T4 AND COOLING OIL TEMPERATURE < U4 ] OR [ MOTOR TEMPERATURE < T1 AND COOLING OIL TEMPERATURE < U1 ] |
| B → B | VEHICLE SPEED ≥ V3 AND [ MOTOR TEMPERATURE ≥ T3 OR COOLING OIL TEMPERATURE ≥ U3 ] |
| B → A | VEHICLE SPEED < V3 OR [ MOTOR TEMPERATURE < T3 AND COOLING OIL TEMPERATURE < U3 ] |
| C → C | VEHICLE SPEED < V2 AND [ MOTOR TEMPERATURE ≥ T3 OR COOLING OIL TEMPERATURE ≥ U3 ] |
| C → A | VEHICLE SPEED ≥ V2 AND [ MOTOR TEMPERATURE ≥ T2 OR COOLING OIL TEMPERATURE ≥ U2 ] |
| C → D | [ VEHICLE SPEED < V2 AND [ MOTOR TEMPERATURE < T3 AND COOLING OIL TEMPERATURE < U3 ] ] OR [ VEHICLE SPEED ≥ V2 AND [ MOTOR TEMPERATURE < T2 AND COOLING OIL TEMPERATURE < U2 ] ] |

FIG. 4
| REGION | OIL PUMP DELIVERY VOLUME |
|---|---|
| A | FIXED AT CONSTANT VALUE (P% OF MAXIMUM OUTPUT) WHEN LLC TEMPERATURE IS EQUAL TO OR HIGHER THAN Tc<br>VARIED STEPWISE ACCORDING TO MOTOR TEMPERATURE WHEN LLC TEMPERATURE IS LOWER THAN Tc |
| B | MAXIMUM |
| C | VARIED STEPWISE ACCORDING TO MOTOR TEMPERATURE |
| D | SHUTDOWN |
FIG. 5
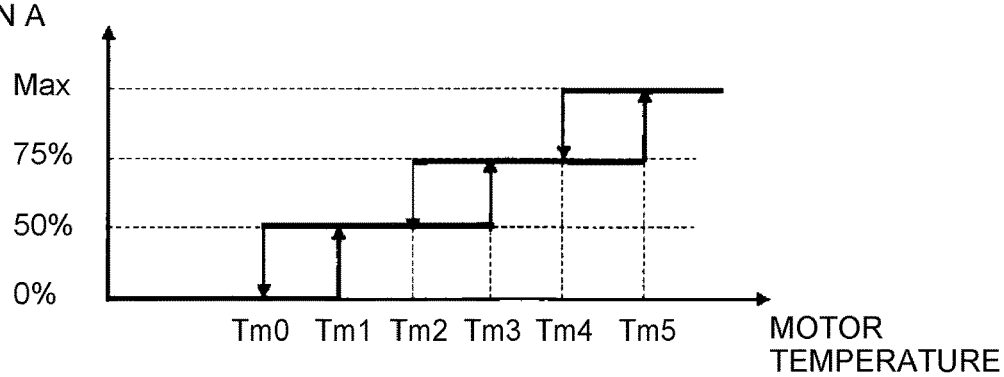
FIG. 6
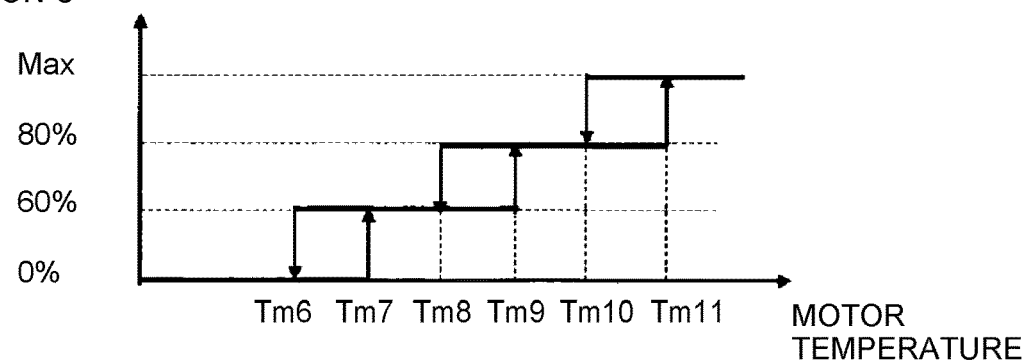

ELECTRIC VEHICLE

CROSS REFERENCE TO RELATED APPLICATION

This application claims priority to Japanese Patent Application No. 2018-010590 filed on Jan. 25, 2018, incorporated herein by reference in its entirety.

BACKGROUND

1. Technical Field

The present disclosure relates to an electric vehicle in which a driving motor is cooled.

2. Description of Related Art

Japanese Patent Application Publication No. 2016-052844 (JP 2016-052844 A) describes a hybrid electric vehicle equipped with a driving motor and an engine. In this electric vehicle, oil used to cool and lubricate the driving motor and a power split device is circulated through collaboration between a mechanical pump that operates on engine torque and an electric pump that operates on a dedicated electric motor. The electric pump is controlled so as to cause the oil to flow at a required flow rate according to states of the electric vehicle, such as a state of the vehicle ready for running after startup, a state of the temperature of the driving motor while the vehicle is running by the driving motor, and a state of the vehicle running by the engine.

SUMMARY

While JP 2016-052844 A describes one aspect of electric pump control, various other aspects of electric pump control in an electric vehicle are conceivable. For example, an electric vehicle in which a driving motor is cooled by using only an electric pump requires electric pump control of an aspect different from that of JP 2016-052844 A.

The present disclosure provides an electric vehicle in which a driving motor is cooled as an electric pump circulates a cooling liquid and which can realize a new aspect of electric pump control.

An electric vehicle according to an aspect of the present disclosure includes a power control unit that converts direct-current power from a battery into alternating-current power, a driving motor that receives a supply of the alternating-current power and generates vehicle driving torque, a first heat exchanger, a second heat exchanger, a first pump, a second pump, a first cooling channel fitted with the first pump that causes a first cooling liquid cooled in the first heat exchanger to flow through the power control unit and the second heat exchanger in this order and return to the first heat exchanger, and a second cooling channel fitted with the second pump that causes a second cooling liquid cooled by the first cooling liquid in the second heat exchanger to flow through the driving motor and return to the second heat exchanger. The second pump is an electric pump. The second pump starts or stops circulation of the second cooling liquid, or increases or reduces a circulation volume of the second cooling liquid, based on one or both of the temperature of the power control unit and the temperature of the first cooling liquid.

An electric vehicle is a vehicle equipped with a driving motor as a driving source. Examples of electric vehicles include, other than vehicles having only a driving motor as a driving source, vehicles that use another driving source, such as an internal combustion engine, in combination with a driving motor. In the above electric vehicle, direct-current power from the battery is converted in the power control unit (hereinafter referred to as a PCU) into alternating-current power required by the driving motor. The PCU includes an inverter, and may also include, for example, a booster that boosts or lowers a voltage. The driving motor generates vehicle driving torque by electric power from the PCU.

The first cooling liquid is circulated through the first cooling channel by the first pump. The first cooling liquid circulates through the first heat exchanger, the PCU, and the second heat exchanger in this order. Other devices may be included among these devices. The first heat exchanger is a device that cools the heated first cooling liquid by outside air etc. The second heat exchanger is a device that cools the heated second cooling liquid by the first cooling liquid. The PCU need be operated at a temperature not exceeding a heat-resistant temperature of a semiconductor device etc., and is therefore cooled by the first cooling liquid. The type of the first cooling liquid is not particularly limited; for example, the first cooling liquid may be a cooling liquid consisting mainly of water or a cooling liquid consisting mainly of oil. When the first cooling liquid consists mainly of oil, the first cooling liquid may serve as lubricating oil in devices through which it circulates. Using a dedicated electric pump as the first pump can stably circulate the first cooling liquid. However, provided that stability can be secured within an allowable range, a pump other than a dedicated electric pump, for example, a mechanical pump using motive power from another source, such as a driving source of the electric vehicle, can also be adopted.

The second cooling liquid is circulated through the second cooling channel by the second pump. The second cooling liquid circulates through the second heat exchanger and the driving motor in this order. Other devices may be included among these devices. The driving motor need be operated at a temperature equal to or lower than a heat-resistant temperature required for the motor, for example, a heat-resistant temperature of permanent magnets in the case of a permanent-magnet motor, and is therefore cooled by the second cooling liquid. The type of the second cooling liquid is not particularly limited; for example, the second cooling liquid may be a cooling liquid consisting mainly of water or a cooling liquid consisting mainly of oil. When the second cooling liquid consists mainly of oil, the second cooling liquid may serve as lubricating oil in devices through which it circulates. A dedicated electric pump prepared for circulating the second cooling liquid is used as the second pump.

The second pump controls the feed volume of the second cooling liquid based on one or both of the temperature of the PCU and the temperature of the first cooling liquid. For example, data on the temperature of the PCU measured at one or more points on an inner side or an outer side thereof can be used as the temperature of the PCU. For example, data on the temperature of the first cooling liquid directly or indirectly measured at one or more points in the first cooling channel can be used as the temperature of the first cooling liquid. Both the temperature of the PCU and the temperature of the first cooling liquid are important pieces of information for determining whether the PCU can be operated at a temperature equal to or lower than the heat-resistant temperature. The volume of the second cooling liquid circulated by the second pump is related to a rise or a decrease of the temperature of the second cooling liquid, and a change in the temperature of the second cooling liquid in turn causes a change in the temperature of the first cooling liquid through the second heat exchanger. Therefore, the second pump is controlled according to one or both of the temperature of the PCU and the temperature of the first cooling liquid.

For example, the second pump may vary the circulation volume continuously, or in two steps or three or more steps, according to a change in the temperature of the PCU or in the temperature of the first cooling liquid. The second pump may be controlled based further on another parameter etc. For example, only when another parameter etc. meets a certain condition, the second pump may be controlled based on one or both of the temperature of the PCU and the temperature of the first cooling liquid. Alternatively, for example, the second pump may be controlled based on an arithmetic expression including another parameter etc. and one or both of the temperature of the PCU and the temperature of the first cooling liquid.

In the above aspect, when one or both of the temperature of the power control unit and the temperature of the first cooling liquid have reached a high temperature, the second pump may reduce the circulation volume of the second cooling liquid or stop the circulation of the second cooling liquid.

When the circulation volume of the second cooling liquid is increased, the temperature of the second cooling liquid rises, and so does the temperature of the first cooling liquid through the second heat exchanger. Conversely, when the circulation volume of the second cooling liquid is reduced, the temperature of the first cooling liquid decreases.

In the above aspect, the second pump may start or stop the circulation of the second cooling liquid, or increase or reduce the circulation volume of the second cooling liquid, based on one or both of the temperature of the driving motor and the temperature of the second cooling liquid.

For example, data on the temperature of the motor measured at one or more points on an inner side or an outer side thereof can be used as the temperature of the motor. For example, data on the temperature of the second cooling liquid measured directly or indirectly at one or more points in the second cooling channel can be used as the temperature of the second cooling liquid. When the temperature of the driving motor or the temperature of the second cooling liquid is thus also taken into consideration, both cooling of the PCU and cooling of the driving motor can be achieved without one compromising the other.

In the above aspect, when one or both of the temperature of the driving motor and the temperature of the second cooling liquid have reached a high temperature, the second pump may start the circulation of the second cooling liquid or increase the circulation volume of the second cooling liquid.

In the above aspect, when one or both of the temperature of the driving motor and the temperature of the second cooling liquid have reached a high temperature while the electric vehicle is running at low speed, the second pump may increase the circulation volume of the second cooling liquid according to a rise of one or both of the temperature of the driving motor and the temperature of the second cooling liquid.

Running at low speed means running at a relatively low speed, which can be, for example, about 50 km/h or lower, 40 km/h or lower, 30 km/h or lower, 20 km/h or lower, or 10 km/h or lower. For example, the speed of the electric vehicle can be directly measured using the number of rotations of a wheel, an axle, etc., or may also be indirectly estimated from the number of rotations or electric power consumption of the driving motor etc. Using the second pump is also effective for securing quietness while the electric vehicle is running at low speed. However, when the vehicle is climbing a long uphill, the temperature of the driving motor rises even if the vehicle is running at low speed. Therefore, the second pump is controlled so as to increase the circulation volume of the second cooling liquid according to this temperature rise.

In the aspect of the present disclosure, although the PCU is cooled by the first cooling liquid and the driving motor is cooled by the second cooling liquid, the second cooling liquid is cooled by the first cooling liquid, and thus this cooling system is of a single-circuit as a whole. As such, this cooling system offers the potential for reducing the total weight compared with a two-circuit system, and moreover for cutting down the system implementation cost. By controlling the second pump based on one or both of the temperature of the PCU and the temperature of the first cooling liquid, this cooling system, despite being of a single-circuit, can achieve both cooling required by the PCU and cooling required by the driving motor without one compromising the other.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a graph showing four regions corresponding to different aspects of oil pump control;

FIG. 3 is a table showing conditions for inter-regional transitions;

FIG. 4 is a table showing the aspects of oil pump control in the respective regions;

FIG. 5 is a graph illustrating the aspect of control in region A when an LLC temperature is low; and FIG. 6 is a graph showing the aspect of control in region C.

DETAILED DESCRIPTION

Figure 1:
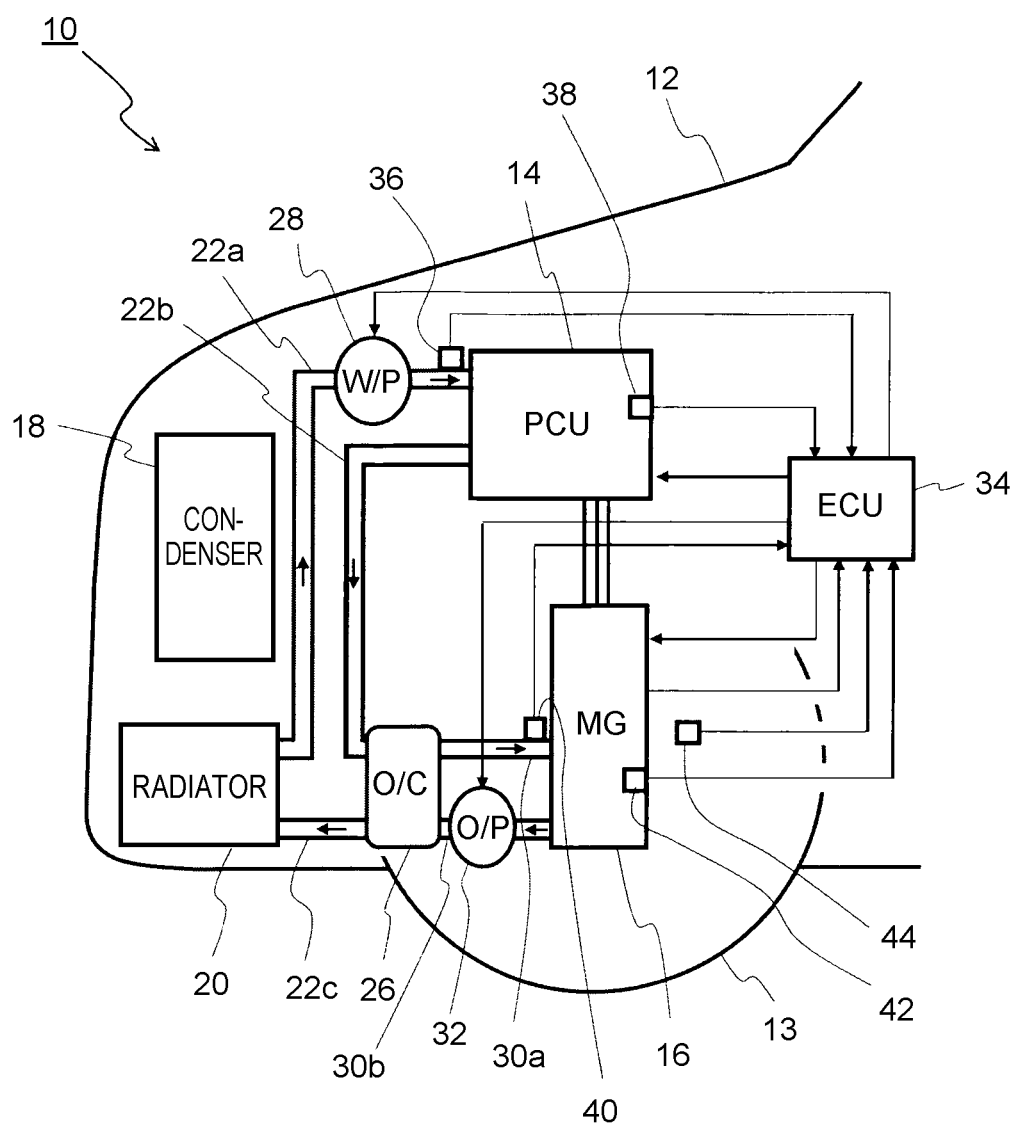
FIG. 1 is a view showing a schematic structure of an electric vehicle according to an embodiment.

An embodiment will be described below with reference to the drawings. While specific aspects will be shown in the following description for easy understanding, these aspects are merely examples of the embodiment and the present disclosure can be implemented in various other embodiments.

FIG. 1 is a view showing a part of the structure of an electric vehicle 10 according to the embodiment. Other than a body 12 and a front wheel 13 on a front side of the electric vehicle, a schematic configuration of various devices contained inside the body 12 is also shown in FIG. 1.

The electric vehicle 10 is equipped with a battery (not shown), and direct-current power is supplied from the battery to a power control unit (hereinafter referred to as a PCU) 14. The PCU 14 is equipped with a charger, a booster, and an inverter. The charger is a device that supplies the battery with electric power supplied from outside the vehicle through a power plug etc. The booster is a device that boosts or raises the voltage of direct-current power. The inverter is a device that converts direct-current power into alternating-current power, and has also a function of a converter that converts alternating-current power into direct-current power. The direct-current power supplied from the battery has the voltage boosted or raised in the booster as necessary, and is then converted into three-phase alternating-current power in the inverter. This three-phase alternating-current power is supplied to a motor generator (hereinafter referred to as an MG) 16.

The MG 16 is a vehicle driving motor that converts three-phase alternating-current power into a rotational motion. The MG 16 includes a stator having a coil, and a rotor installed on an inner side of the stator. A plurality of permanent magnets is embedded in the rotor and a plurality of magnetic poles is formed. The rotor generates vehicle driving torque by rotating around a rotor axis as the coil of the stator receives a force from a rotating magnetic field generated by the three-phase alternating-current power. This torque is transmitted to the front wheels 13 through a driving shaft to drive the electric vehicle 10. The MG 16 functions also as a generator that generates electric power by using torque transmitted through the driving shaft. The generated electric power is stored in the battery through the PCU 14.

A condenser 18 that is a heat exchanger for an air conditioner is provided at a foremost part of the electric vehicle 10. The condenser 18 is a device that cools and condenses a high-temperature, high-pressure cooling medium compressed in a compressor. The condensed cooling medium is evaporated and cooled to a low temperature before being used to cool air inside a vehicle cabin. The vicinity of an upper part of the condenser 18 reaches a high-temperature state exceeding 100 degrees depending on service conditions, while the vicinity of a lower part of the condenser 18 is kept at a relatively low temperature.

A radiator 20 is provided behind the lower part of the condenser 18. The radiator 20 is a heat exchanger that cools a long-life coolant (LLC) that is a type of coolant. The LLC is an example of the first cooling liquid, and the radiator 20 is an example of the first heat exchanger. A flow channel 22a extends from the radiator 20 to the PCU 14. A flow channel 22b extends from the PCU 14 to the oil cooler 26. A flow channel 22c extends from the oil cooler 26 to the radiator 20. The LLC acts as a cooling medium while circulating through one continuous cooling channel including the flow channels 22a, 22b, 22c. This circulation is driven by a water pump 28 that is an electric pump provided in the flow channel 22a. The water pump 28 is an example of the first pump.

The oil cooler 26 is a heat exchanger in which the LLC and cooling oil exchange heat with each other. The cooling oil is an example of the second cooling liquid, and the oil cooler 26 is an example of the second heat exchanger. A flow channel 30a extends from the oil cooler 26 to the MG 16, and a flow channel 30b extends from the MG 16 to the oil cooler 26. The cooling oil acts as a cooling medium while circulating through one continuous cooling channel including the flow channels 30a, 30b. This circulation is driven by an oil pump 32 that is an electric pump provided in the flow channel 30a. The oil pump 32 is an example of the second pump. The output of the oil pump 32 is controlled through PWM control based on on-off switching of electric power. Specifically, the output is increased when a duty ratio that is a ratio of a time for which the switch is on is increased, and the output is reduced when this duty ratio is reduced. The output of the oil pump 32 is approximately proportional to the circulation volume of the cooling oil circulated by the oil pump 32. Therefore, the oil pump 32 allows for not only on-off control of the circulation volume but also control of the circulation volume in an on state.

The electric vehicle 10 is provided with an electric control unit (ECU) 34 that controls the vehicle. The ECU 34 is composed of hardware having the function of a computer, and software, such as programs and data, used for the operation of the hardware. Data from various sensors are input into the ECU 34. In the example shown in FIG. 1, a temperature sensor 36 provided near an inlet of the PCU 14 in the flow channel 22a measures the temperature of the LLC flowing through the flow channel 22a, and data on the measured LLC temperature are input into the ECU 34. A temperature sensor 38 is installed in the PCU 14 at a portion at which the temperature sensor 38 can directly monitor or indirectly infer whether the PCU 14 has reached a heat-resistant temperature. Data on the PCU temperature are input from the temperature sensor 38 into the ECU 34. A temperature sensor 40 that measures the temperature of the cooling oil flowing through the flow channel 30a is provided near an inlet of the MG 16 in the flow channel 30a. Data on the cooling oil temperature measured by the temperature sensor 40 are also input into the ECU 34. Moreover, a temperature sensor 42 that measures the temperature of the stator coil is provided in the MG 16, and data on the motor temperature measured by the temperature sensor 42 are also input into the ECU 34. The temperature of the permanent magnets contained in a rotor core can be estimated from the temperature of the stator coil. Data on the speed of the electric vehicle 10 are also input into the ECU 34. Specifically, data on the number of rotations per unit time of the rotor are input from the MG 16, and data on the speed of the electric vehicle 10 are input from a speed meter 44 that measures the number of rotations of the axle of the front wheel 13.

The ECU 34 exerts control based on the software and according to these pieces of data. Specifically, the ECU 34 controls the water pump 28 as to starting or stopping the circulation of the LLC and increasing or reducing the circulation volume of the LLC. The ECU 34 also controls the oil pump 32 as to starting or stopping the circulation of the cooling oil and increasing or reducing the circulation volume of the cooling oil. Moreover, based on a speed command from a driver, the ECU 34 causes the PCU 14 and the MG 16 to generate alternating-current power and to generate torque based on the alternating-current power.

Here, the operation of the electric vehicle 10 will be described. To cause the electric vehicle 10 to run, electric power is converted by the PCU 14 and driving torque is generated by the MG 16 in the vehicle. Meanwhile, the temperature of the PCU 14 rises as some amount of electric power is consumed in a semiconductor device etc. The temperature of the MG 16 also rises as heat is generated, in a larger amount than in the PCU 14, due to copper loss in the coil, iron loss in the permanent magnets and the core, etc.

The heat-resistant temperature of the PCU 14 is determined by the heat-resistant temperature of the semiconductor device included in the PCU 14. The value of this temperature is relatively low at, for example, about 60 degrees Celsius to 80 degrees Celsius. Therefore, the PCU 14 is cooled by the LLC. The LLC is circulated through the cooling channel by the water pump 28. Specifically, the LLC is cooled by outside air in the radiator 20, and is then sent to the PCU 14 through the flow channel 22a to cool the PCU 14. Subsequently, the LLC is sent to the oil cooler 26 through the flow channel 22b to cool the cooling oil. As a result of cooling the PCU 14, the LLC has a higher temperature than an initial temperature. However, since the PCU 14 generates a relatively small amount of heat and has a low temperature, the LLC can cool the cooling oil. Thereafter, the LLC returns to the radiator 20 and is cooled again.

For example, the heat-resistant temperature of the MG 16 is determined by a temperature at which the permanent magnets are demagnetized. The temperature at which demagnetization of the permanent magnets occurs varies with the type of material of the magnet, and is, for example, about 100 degrees Celsius to 300 degrees Celsius. Depending on conditions, the heat-resistant temperature of the MG 16 can be lower than the heat-resistant temperature of the PCU 14. In this embodiment, however, it is assumed that the heat-resistant temperature of the MG 16 is higher than the heat-resistant temperature of the PCU 14.

The MG 16 is cooled by the cooling oil and kept at or below the heat-resistant temperature. The cooling oil is circulated by the oil pump 32. Specifically, the cooling oil is cooled in the oil cooler 26, and is then sent to the MG 16 through the flow channel 30a. After cooling the MG 16, the cooling oil is returned to the oil cooler 26 through the flow channel 30b.

The heat that the cooling oil has taken away from the MG 16 is given to the LLC through the oil cooler 26. Accordingly, the LLC is directly given exhaust heat of the PCU 14 as well as indirectly given exhaust heat of the MG 16. These heats are released into outside air through the radiator 20. Thus, it can be said that the PCU 14 and the MG 16 are cooled by a single-circuit cooling system in the electric vehicle 10. Compared with a two-circuit cooling system in which the PCU 14 and the MG 16 are cooled independently of each other, the single-circuit cooling system offers the potential for reducing the device weight. Moreover, this system offers the potential for reducing the manufacturing cost.

To build a single-circuit cooling system, devices having the capacity to cool the PCU 14 and the MG 16 are selected. For example, a radiator having the capacity to release maximum amounts of heat discharged by the PCU 14 and the MG 16 under severe running conditions is adopted as the radiator 20. Pumps that can secure the required circulation volume when operated at a maximum output are selected as the water pump 28 and the oil pump 32. However, operating the water pump 28 and the oil pump 32 at the maximum output at all times would lower the energy efficiency. Moreover, pumps emit a relatively loud noise, so that immoderately operating these pumps causes unwanted noise in the electric vehicle 10. Therefore, cooling at a moderate level can be said to be desirable.

In the single-circuit cooling system, the balance between cooling of the PCU 14 and cooling of the MG 16 need also be taken into consideration. For example, if cooling of the MG 16 is sufficiently promoted, a situation can arise where the temperature of the LLC rises through the oil cooler 26 and the PCU 14 cannot be sufficiently cooled. Therefore, promoting cooling of the MG 16 while monitoring the temperature of the LLC or the temperature of the PCU 14 can be said to be desirable.

The ECU 34 is programmed so as to control cooling with those conditions taken into account. In the following, control of the oil pump 32 by the ECU 34 will be described in detail with reference to FIG. 2 to FIG. 6. In the following description, it is assumed that the oil pump 32 is controlled according to the circumstances while the water pump 28 is operated at a constant delivery volume.

FIG. 2 is a graph showing regions corresponding to aspects of the control of the oil pump 32. The horizontal axis represents the speed of the electric vehicle 10 measured by the speed meter 44, and the left vertical axis represents the motor temperature measured by the temperature sensor 42 of the MG 16. The right vertical axis represents the cooling oil temperature measured by the temperature sensor 40. The motor temperature and the cooling oil temperature are not in a one-to-one relationship but in a correspondence relationship that varies according to the conditions. In general, however, the cooling oil reaches a high temperature when the motor temperature reaches a high temperature, and thus there is a high degree of correlation between the two.

In FIG. 2, the graph area is divided into four regions of region A, region B, region C, and region D according to the vehicle speed and the motor temperature or the cooling oil temperature. Region A covers a state where the motor temperature has become rather high while the vehicle is running at medium speed. Specifically, region A is a range where the vehicle speed is V2 or higher, and the motor temperature is T2 or higher or the cooling oil temperature is U2 or higher. However, of the range defined by this condition, a range where the vehicle speed is V4 or higher, and the motor temperature is T4 or higher or the cooling oil temperature is U4 or higher is classified as region B. Region C represents a region where the vehicle is running at low speed but the motor is considerably heated, as in the case of climbing a long uphill. Specifically, region C is a range where the vehicle speed is lower than V2, and the motor temperature is T4 or higher or the cooling oil temperature is U4 or higher. The range other than those ranges is region D. Specifically, region D is a range where, when the vehicle speed is from zero (stationary state) to lower than V2, the motor temperature is lower than T4 and the cooling oil temperature is lower than U4, and when the vehicle speed is V2 or higher, the motor temperature is lower than T2 and the cooling oil temperature is lower than U2.

Boundaries of these regions can vary depending on various conditions of the electric vehicle 10. However, the following values can be given as examples: V2 is a value of about 10 km/h to 50 km/h, and V4 is a value of about 80 km/h to 120 km/h. T2 is a value of about 60 degrees Celsius to 100 degrees Celsius; U2 is a value of about 50 degrees Celsius to 90 degrees Celsius; T4 is a value of about 90 degrees Celsius to 200 degrees Celsius; and U4 is a value of about 80 degrees Celsius to 150 degrees Celsius. It is fully conceivable that these temperatures assume values outside the ranges given above as examples, as especially the conditions for a temperature vary significantly depending on the location of an object to be measured.

The electric vehicle 10 is classified as being in one of region A to region D according to the running state of the vehicle. The electric vehicle 10 transitions among regions A to D according to a change in the vehicle speed and a change in the motor temperature or in the cooling oil temperature. In principle, a transition occurs when the electric vehicle 10 has entered the range of a new region. However, if this condition is applied as is, control operations may become unstable when the electric vehicle 10 exhibiting a state near a boundary between regions frequently moves back and forth across the boundary. Therefore, slightly different conditions are used for when the electric vehicle 10 transitions from one region to another region and when the electric vehicle 10 returns to an original region. Specifically, for the speed, V1 that is slightly lower than V2 (e.g., by about 5 km/h) and V3 that is slightly lower than V4 (e.g., by about 10 km/h) are set. For the motor temperature, T1 that is slightly lower than T2 (e.g., by about 10 degrees Celsius) and T3 that is slightly lower than T4 are set. For the cooling oil temperature, U1 that is slightly lower than U2 and U3 that is slightly lower than U4 are set. The regions are switched according to the conditions shown in FIG. 3.

FIG. 3 is a table listing conditions for transitions between adjacent regions. The left column shows from which region to which region the transition occurs, and the right column shows the condition corresponding to the transition in the left column. For example, "D→A" means a transition from region D to region A. In the case where the electric vehicle 10 belongs to region D at one time, the electric vehicle 10 transitions to region A at the next time, when the conditions "vehicle speed≥V2 and [motor temperature≥T2 or cooling oil temperature≥U2" are met, i.e., when the conditions that the vehicle speed is V2 or higher, and that the motor temperature is T2 or higher or the cooling oil temperature is U4 or higher are met. Similarly, the transition from region D to region C occurs on the conditions that the vehicle speed is lower than V2, and that the motor temperature is T4 or higher or the cooling oil temperature is U4 or higher. The conditions for remaining in region A are that the vehicle speed is V1 or higher and [the motor temperature is T1 or higher or the cooling oil temperature is U1 or higher], or that the vehicle speed is lower than V4 or [the motor temperature is lower than T4 and the cooling oil temperature is lower than U4]. The ECU 34 checks for the conditions shown in FIG. 3 on a regular basis (e.g., once every second, once every five seconds, etc.). The ECU 34 controls the oil pump 32 according to the region.

FIG. 4 is a table showing the aspects of the control of the oil pump 32 in the respective regions A to D. In region A, the oil pump 32 is controlled according to the LLC temperature. When the LLC temperature is equal to or higher than Tc, the oil pump 32 is controlled so as to fix the delivery volume at a constant value (P % of the maximum output). When the LLC temperature is equal to or higher than Tc, the LLC temperature is relatively high and the LLC cannot sufficiently cool the PCU 14. Therefore, cooling of the MG 16 is suppressed by limiting the output of the oil pump 32 to P % of the maximum output. While depending also on the heat-resistant temperature of the PCU 14, the temperature Tc can be considered to be, for example, about 50 degrees Celsius to 80 degrees Celsius. The value of P % is selected within such a range that a rise of the LLC temperature can be suppressed. While the specific value can vary with conditions, the value of P can be considered to be, for example, about 30% to 70%.

In region A, when the LLC temperature is lower than Tc, the oil pump 32 is controlled so as to vary the delivery volume stepwise according to the motor temperature. When the LLC temperature is lower than Tc, the LLC can sufficiently cool the PCU 14. Accordingly, cooling of the MG 16 can be enhanced. Therefore, the oil pump 32 is controlled so as to sufficiently cool the MG 16 according to the motor temperature.

FIG. 5 is a graph illustrating the aspect of the control of the oil pump 32 in region A when the LLC temperature is lower than Tc. Here, the pump output on the vertical axis is set according to the value of the motor temperature on the horizontal axis. Specifically, the pump output is increased as the motor temperature rises, and the pump output is reduced as the motor temperature decreases. However, if the pump output is increased and reduced at the same motor temperature, the operation of the pump may become unstable around that motor temperature. Therefore, the motor temperature at which the pump output is reduced is set to be slightly lower than the motor temperature at which the pump output is increased.

Specifically, six threshold values Tm0 to Tm5 are set for the motor temperature. These temperatures have a relationship of Tm0<Tm1<Tm2<Tm3<Tm4<Tm5. In the course of a rise of the motor temperature, the oil pump 32 is controlled as follows: When the motor temperature is lower than Tm1, the pump is shut down, and when the motor temperature has risen to Tm1 or higher, the pump is started and the pump output is set to 50% of the maximum value. When the motor temperature has further risen to Tm3 or higher, the pump output is increased to 75% of the maximum value. When the motor temperature has risen to Tm5 or higher, the pump output is set to the maximum value (100%). In the course of a decrease of the motor temperature, the oil pump 32 is controlled as follows: When the motor temperature has decreased to below Tm4, the pump output is reduced to 75%. When the motor temperature has decreased to below Tm2, the pump output is reduced to 50%. When the motor output has decreased to below Tm0, the pump is shut down. The values of Tm0 to Tm5 are set appropriately with a cooling state of the motor taken into account. Alternatively, the pump output may be varied in a larger number of steps according to the motor temperature, or varied in an infinite number of steps according to an arithmetic expression.

In the above description, the oil pump 32 is controlled in region A such that the output is fixed at a constant value when the LLC temperature is equal to or higher than Tc, and that the output is varied within the range of 0% to 100% only when the LLC temperature is lower than Tc. However, it is also possible to control the oil pump 32 so as to vary the output when the LLC temperature is equal to or higher than Tc. Specifically, an aspect can be given as an example in which, with the upper limit of the output set to P %, the output is varied within the range of 0% to P % according to the motor temperature. In the above description, the oil pump 32 is controlled in region A differently between the two cases of when the LLC temperature is equal to or higher than Tc and when the LLC temperature is lower than Tc. However, the oil pump 32 may be controlled differently among three or more cases according to the LLC temperature.

Referring back to FIG. 4, the description of the control of the oil pump 32 in each region will be continued. In region B, the output of the oil pump 32 is set to the maximum value. In region B, as the MG 16 is driven at high rotation speed, the motor temperature reaches a high temperature and the MG 16 is subjected to severe conditions. Therefore, the oil pump 32 maximizes the circulation volume of the cooling oil to cool the MG 16. As a result, a large amount of exhaust heat of the MG 16 is transmitted to the LLC, but a large amount of heat is taken away from the radiator 20 by outside air flowing at high speed, so that the LLC temperature does not rise significantly. Accordingly, the PCU 14 can also be sufficiently cooled.

In region C, the oil pump 32 is controlled so as to vary the delivery volume stepwise according to the motor temperature. In general, in a low-speed region (a region where the vehicle speed is lower than V2) including region C, the electric vehicle 10 is in a quiet state. Specifically, noise from the MG 16, noise occurring between tires and a road surface, wind noise, etc. are small, and thus the vehicle cabin of the electric vehicle 10 is in a sufficiently quiet state. Therefore, unlike in region A, the oil pump 32 is controlled to be shut down even when the motor temperature is between T2 and T4, so as to maintain the quietness. However, for example, when the vehicle is climbing a long uphill, the MG 16 is required to output a large driving torque even if the vehicle is running at low speed, so that the motor temperature rises. Moreover, when the vehicle is climbing a hill, especially the PCU 14 that converts electric power tends to generate heat. Therefore, as soon as the motor temperature has reached region C where the motor temperature is T4 or higher, cooling is performed stepwise according to the motor temperature.

FIG. 6 is a view illustrating the aspect of the control of the oil pump 32 in region C. Here, similarly to the aspect described with FIG. 5, the pump output is increased as the motor temperature rises, and the pump output is reduced as the motor temperature decreases. Also as in FIG. 5, the motor temperature at which the pump output is increased and the motor temperature at which the pump output is reduced are differentiated from each other. Specifically, temperatures having a relationship of Tm6<Tm7<Tm8<Tm9<Tm10<Tm11 are set. In the course of a temperature rise, the oil pump 32 is controlled as follows: When the motor temperature is lower than Tm7, the pump is shut down. When the motor temperature has risen to Tm7 or higher, the pump output is set to 60%. When the motor temperature has risen to Tm9 or higher, the pump output is increased to 80%. When the motor temperature has risen to Tm11 or higher, the pump output is set to the maximum value (100%). In the course of a decrease of the motor temperature, the oil pump 32 is controlled as follows: When the motor temperature has decreased to below Tm10, the pump output is reduced to 80%. When the motor temperature has decreased to below Tm8, the pump output is reduced to 60%. When the motor output has decreased to below Tm0, the pump is shut down.

In this aspect of the control in region C, the pump output is set within such a range that the PCU 14 heated to a high temperature can be sufficiently cooled, and both cooling of the PCU 14 and cooling of the MG 16 can be achieved without one compromising the other. In region C, it is also possible to control the output of the oil pump 32 in a larger number of steps according to the motor temperature.

Referring back to FIG. 4 again, the aspect of the control of the oil pump 32 in region D will be described. In region D, the oil pump 32 is shut down. The oil pump 32 is thus controlled, because region D is a region where the motor temperature is lower than T2 and it is hardly necessary to cool the MG 16. When the vehicle speed is lower than V2, to avoid disrupting the quietness of the electric vehicle 10 by driving noise of the oil pump 32, the oil pump 32 is shut down even when the motor temperature is within the range of T2 or higher to lower than T4.

The aspect of controlling the oil pump 32 by dividing the state of the electric vehicle 10 into the four regions shown in FIG. 2 has been described above. These four regions are merely one aspect of the control method. For example, region A may be further divided to perform detailed control, or region A and region B may be combined to control the oil pump 32 according to common conditions. In either case, the aspect of the control is determined so as to achieve both cooling of the PCU 14 and cooling of the MG 16 without one compromising the other.

In the foregoing description, it is assumed that the water pump 28 is driven at a constant output at all times. The water pump 28 is related to cooling of the PCU 14 by the LLC and exhaust heat of the LLC in the radiator 20. The water pump 28 is also related to cooling of the MG 16 by the cooling oil and heat exchange between the cooling oil and the LLC through the oil cooler 26. Thus, there is room for increasing the efficiency of the entire cooling process by controlling the water pump 28. For example, the water pump 28 may be driven at low output when both the motor temperature (or the cooling oil temperature) and the PCU temperature (or the LLC temperature) are low. The water pump 28 may be driven at high output when at least one of the motor temperature (or the cooling oil temperature) and the PCU temperature (or the LLC temperature) is high. Thus controlling the water pump 28 is considered to improve the cooling process. However, the aspects of the control of the oil pump 32 described above can be implemented regardless of whether or not to perform detailed control of the water pump 28.

The cooling oil circulated by the oil pump 32 can double as oil that lubricates a transmission etc. For example, the cooling oil circulated through the MG 16 can be circulated also through a nearby gear or a differential gear to secure lubrication of such a gear. As lubricating oil is called an automatic transmission fluid (ATF), when the cooling oil doubles as lubricating oil, this cooling oil can be called an ATF. Alternatively, an ATF used for lubrication may be provided separately from cooling oil and circulated separately by a mechanical pump etc. In this case, oil having the same composition as the ATF can be used as the cooling oil.

The electric vehicle 10 can be equipped with an internal combustion engine, such as a gasoline engine, as a driving source in addition to the MG 16. When the electric vehicle 10 is such a hybrid vehicle, a mechanism for cooling the internal combustion engine is required. The mechanical pump can be driven based on driving torque generated by the internal combustion engine. At any rate, the aspects of the control of the oil pump 32 described above can be implemented also in a hybrid vehicle.

What is claimed is:

1. An electric vehicle comprising:
   a power control unit that converts direct-current power from a battery into alternating-current power;
   a driving motor that receives a supply of the alternating-current power and generates vehicle driving torque;
   a first heat exchanger;
   a second heat exchanger;
   a first pump;
   a second pump;
   a first cooling channel fitted with the first pump that causes a first cooling liquid to flow through and be cooled in the first heat exchanger, to flow through and cool the power control unit and to flow through the second heat exchanger and cool a second cooling liquid in the second heat exchanger in this order and return to the first heat exchanger, the first cooling liquid being a separate cooling liquid from the second cooling liquid; and
   a second cooling channel fitted with the second pump that causes the second cooling liquid cooled by the first cooling liquid in the second heat exchanger to flow through the driving motor and return to the second heat exchanger,
   wherein the second pump is an electric pump, and
   wherein the second pump starts or stops circulation of the second cooling liquid, or increases or reduces a circulation volume of the second cooling liquid, based on one or both of a temperature of the power control unit and a temperature of the first cooling liquid.

2. The electric vehicle according to claim 1, wherein, when one or both of the temperature of the power control unit and the temperature of the first cooling liquid have reached a predetermined temperature, the second pump reduces the circulation volume of the second cooling liquid or stops the circulation of the second cooling liquid.

3. The electric vehicle according to claim 1, wherein the second pump starts or stops the circulation of the second cooling liquid, or increases or reduces the circulation volume of the second cooling liquid, based on one or both of a temperature of the driving motor and a temperature of the second cooling liquid.

4. The electric vehicle according to claim 3, wherein, when one or both of the temperature of the driving motor and the temperature of the second cooling liquid have reached a predetermined temperature, the second pump starts the circulation of the second cooling liquid or increases the circulation volume of the second cooling liquid.

5. The electric vehicle according to claim 4, wherein, when one or both of the temperature of the driving motor and the temperature of the second cooling liquid have reached a high temperature while the electric vehicle is running at low speed, the second pump increases the circulation volume of the second cooling liquid according to a rise of one or both of the temperature of the driving motor and the temperature of the second cooling liquid.

6. The electric vehicle according to claim 1, wherein a type of the first cooling liquid is different from a type of the second cooling liquid.

7. The electric vehicle according to claim 6, wherein the first cooling liquid is a long-life coolant, and the second cooling liquid is a cooling oil.

* * * * *